United States Patent [19]

Brzozowski et al.

[11] 4,074,990

[45] * Feb. 21, 1978

[54] METHOD OF PREPARING COLEMANITE-CONTAINING GLASS BATCH

[75] Inventors: Stanley F. Brzozowski, Coraopolis; Joseph E. Cooper, Brackenridge, both of Pa.

[73] Assignee: PPG Industries, Inc., Pittsburgh, Pa.

[*] Notice: The portion of the term of this patent subsequent to Feb. 21, 1995, has been disclaimed.

[21] Appl. No.: 739,884

[22] Filed: Nov. 8, 1976

[51] Int. Cl.$^2$ ............................................. C03B 5/16
[52] U.S. Cl. ......................................... 65/27; 65/134; 65/136; 106/50; 106/54
[58] Field of Search ................... 106/50, 54, DIG. 8; 65/27, 134, 136

[56] References Cited

U.S. PATENT DOCUMENTS

| 2,334,961 | 11/1943 | Schoenlaub | 65/134 X |
| 2,366,473 | 1/1945 | Bair | 106/50 X |
| 2,976,162 | 3/1961 | Ekdahl | 65/134 X |
| 3,001,881 | 9/1961 | Slayter | 65/134 X |
| 3,274,006 | 9/1966 | McKinnis | 106/50 |
| 3,287,095 | 11/1966 | Procter et al. | 65/2 |
| 3,880,639 | 4/1975 | Bodner et al. | 64/134 |
| 3,887,671 | 6/1975 | Metzger | 264/43 |
| 3,914,364 | 10/1975 | Engelleitner et al. | 264/117 |

*Primary Examiner*—Robert L. Lindsay, Jr.
*Attorney, Agent, or Firm*—Alan T. McDonald; John E. Curley

[57] ABSTRACT

A process is described for preparing colemanite-containing glass batch compositions suitable for the preparation of glass fibers in which the batch, prior to its introduction into the furnace, is pelletized by adding water in sufficient quantities to maintain an adequate balling action and thus provide pellets in a form such that preheating by direct contact with flue gases does not cause deterioration of the pellets.

8 Claims, No Drawings

METHOD OF PREPARING COLEMANITE-CONTAINING GLASS BATCH

BACKGROUND OF THE INVENTION

Fiber glass batches, unlike soda lime-glass batches and other commercial batches utilized to make containers and flat glass, are fed to fiber glass melting furnaces in an extremely fine condition, i.e., almost all batch particles are less than 20 mesh, with the majority being less than 200 mesh. Because of the fineness of the batch ingredients, dusting is encountered in fiber glass batch melting furnaces. In addition, fiber glass batches contain considerable quantities of boron-containing materials and other rather expensive ingredients, some of which are lost in the stack gases should dusting occur during feeding. Further, some of these batch materials volatilize into the stack gases as they are melted. By cohesively binding batch ingredients of the fineness normally encountered in a fiber glass batch, reduced dusting and volatilization of the batch ingredients and the concomitant reduction in the loss of expensive ingredients can be achieved. In addition, by providing fiber glass batch in pelletized form, advantage can be taken of the sensible heat contained in furnace flue gases to preheat fiber glass batch pellets prior to feeding them to the glass melting furnace. Further, the close contact between the particles within the pellets improves their heat transfer characteristics and thus results in faster melting, improved energy efficiency and reduced furnace wear.

Considerable activity has taken place in recent years and particularly in relation to the preparation of soda-lime glass batches in which the batch ingredients have been pelletized for feed to glass melting furnaces. Thus, a recent U.S. Pat. No. 3,880,639 describes the utilization of an agglomerated soda-lime glass batch in which the pellets are preheated via direct heat exchangers prior to feeding them to a glass melting furnace.

Activity has also occurred in the preparation of fiber glass batches in that glass batches have been prepared with various binding materials for the preparation of briquettes for feeding to glass melting furnaces. U.S. Pat. No. 2,976,162 describes a process of this nature. In other patent literature involved in the preparation of fiber glass type batches, special treatments have been applied to the glass batch to provide for prereaction of glass batch ingredients prior to feeding them to the glass melting furnace. A process of this character is described in U.S. Pat. No. 3,001,881. Still further, the glass batch ingredients themselves have been carefully selected to provide boron-containing glass batch materials of specific character to help eliminate some of the foaming problems occurring during melting utilizing high boron-containing glass batches, such as are encountered in the fiber glass industry. A patent describing one such process is U.S. Pat. No. 3,287,095.

THE PRESENT INVENTION

In accordance with the present invention, boron-containing fiber glass batch pellets utilizing colemanite as a boron source are prepared by introducing the batch ingredients in appropriate proportions into a pelletizing zone, such as an inclined rotating disc pelletizer, as is shown in U.S. Pat. No. 3,914,364, which is incorporated herein by reference, and adding to the batch ingredients as they are rotated on the pelletizer sufficient water to agglomerate and support the continuous production of glass batch pellets of a desired size. The pellets may range, for example, in nominal diameter from about 0.125 to about 1.00 inch (0.3175 to 2.54 centimeters) and preferably between about 0.375 and 0.625 inch (0.9525 and 1.5875 centimeters). Sufficient water is added to bind the batch ingredients and provide pellets preferably containing approximately 5 to 20 percent by weight free water. Most preferably, the water is added to provide approximately 10 to 13 percent by weight free water.

The batch ingredients may contain only colemanite as the source of $B_2O_3$. Optionally, up to about 75 percent or more of the colemanite, on a $B_2O_3$ basis, may be substituted by boric acid, while adjusting for lost silica, calcia and alumina contained in the colemanite. The pellets after formation are dried at a temperature preferably from about 220° F. (104.4° C.) or less to 770° F. (410° C.) to a free water content of preferably about 1 percent by weight or less, to produce hard, substantially non-dusting pellets. The hard, non-dusting pellets thus formed can be fed to a glass melting furnace and exposed to conditions in excess of 2700° F. (1482.2° C.) without any explosions of the pellets occurring.

DETAILED DESCRIPTION OF THE INVENTION

Typical "E" glass type boron-containing glass fiber forming compositions are illustrated in U.S. Pat. No. 2,334,961, which is incorporated herein by reference. These compositions comprise silica, clay, coal, boric acid, limestone, fluorspar, sodium sulfate and ammonium sulfate. In lieu of boric acid, colemanite may be used. The use of colemanite is described in U.S. Pat. No. 3,274,006. Colemanite has a chemical composition of $Ca_2B_6O_{11}.5 H_2O$. Optionally, boric acid may be substituted for up to about 75 percent or more of the colemanite on an equivalent $B_2O_3$ basis while adjusting for lost silica, calcia and alumina from the colemanite. There is no caustic soda present in the compositions.

It is extremely important in the preparation of glass batch pellets in accordance with the present invention that, if colemanite is used as the single source of $B_2O_3$, temperatures above 770° F. (410° C.) should be avoided during the drying step. Attempts to dry these pellets above this temperature result in the disintegration of the pellets and their return to the powdery state. Thus, extreme care is taken to provide pellets by regulating the drying operation, such that the pellets are dried at temperatures not exceeding 770° F. (410° C.).

When boric acid is substituted for up to about 75 percent or more of the colemanite, with proper adjustments being made for silica, calcia and alumina in composition, these temperature parameters must still be followed. Hard, non-dusting pellets can be produced at drying temperatures up to 770° F. (410° C.).

When drying the pellets of the present invention, should the temperature of the pellets exceed 770° F. (410° C.), it has been found that the pellets crack and disintegrate. This problem, however, may be solved by pretreating the colemanite prior to its addition to the glass batch, and forming the glass batch into pellets. This pretreatment comprises heating the colemanite at a temperature above 770° F. (410° C.) for a sufficient period of time until substantially all of the chemically bound water in the colemanite is driven from this material. An equation for this reaction is shown below as equation (6). This water amounts to approximately 21 to 22 percent by weight. There is also an expansion of up to 33 percent by volume of the colemanite when the chemically bound water is driven off, which accounts for the cracking of untreated pellets when heated above this temperature. By employing this pretreatment to the colemanite prior to its introduction into the glass batch, pellets as heretofore described may be dried at any temperature from about 220° F. or less (104.4° C.) to the melting point of a given pellet, and preferably between about 220° F. and 1000° F. (104.4° C. and 537.8° C.), without fear of cracking, to produce hard, non-dusting pellets.

Glass batch ingredients prepared in accordance with the instant invention are believed to undergo several chemical reactions during their deposition on the pelletizing disc and while water in the quantity sufficient to produce the pellets is being added to the ingredients and during the drying of the pellets. The primary reactions involving the preparation of the pellets in accordance with the instant invention are believed to be as follows:

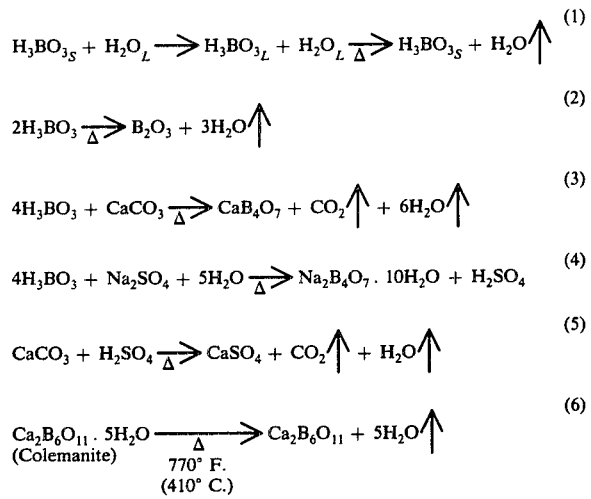

In reaction (1) the boric acid and water react to dissolve the boric acid and then the boric acid is recrystallized as shown in the equation. The recrystallized boric acid is dehydrated during the drying step to drive water off, as is shown in equation (2). Some of the boric acid itself during the drying of the pellets reacts with the calcium carbonate present to form hydrated calcium pyroborate, carbon dioxide and water in accordance with equation (3). Boric acid also reacts with sodium sulfate present in the batch in accordance with equation (4) to form hydrated sodium tetraborate and sulfuric acid. The limestone and sulfuric acid may also react to form calcium sulfate, carbon dioxide and water in accordance with equation (5).

Regardless of the reactions that take place, pellets produced in accordance with the practice of this invention thus provided to a glass melting furnace for the production of glass fibers are hard and considerably less dusty than the loose batch ingredients conventionally employed. Further, since the boric acid is an excellent fluxing agent, the wetting of the boric acid upon its intimate contact with all batch ingredients, in addition to causing reactions as indicated hereinabove in equations (1) through (5), provides for intimate contact of the boron contained in the batch with all of the other batch grains present. This assists in rapidly melting the silica and alumina constituents of the glass batch which, as will be readily understood, are the most difficult ingredients to dissolve.

The pellets of the present invention may be preheated prior to their addition to the glass melting furnace such as, for example, by passing them through the flue gases of the furnace or passing the gases through a bed of the pellets. In addition to preheating the pellets and thus reducing the amount of furnace input energy needed to melt them, this passage of flue gases through a bed of pellets may cause a reduction of air pollution from the flue gases by removing via a filtering action at least part of the harmful materials, such as $F_2$ and $B_2O_3$, from the flue gases. Utilizing hot flue gases of temperatures typically in the range of about 800° F. to 2850° F. (426.7° C. to 1565.6° C.) pellets can be preheated to temperatures of about 200° F. to 1500° F. (93.3° C. to 815.6° C.) to recover sensible heat and assist in reducing the amount of fuel needed to melt the pellets fed to the furnace.

EXAMPLE I

An "E" type fiber forming glass batch comprising:

| Component | Percent by Weight |
|---|---|
| Silica | 30.758 |
| Clay | 27.986 |
| Limestone | 20.922 |
| Coal | 0.108 |
| Fluorspar | 2.454 |
| Ammonium Sulfate | 0.237 |
| Sodium Sulfate | 1.041 |
| Colemanite | 16.494 | was combined on a disc pelletizer with sufficient water to produce pellets containing about 12 percent by weight free water. The pellets were dried at temperatures of approximately 490° F. to 525° F. (254.4° C. to 273.9° C.) for approximately 5 minutes. The resulting pellets produced were rigid, however, most could be crushed by hand pressure.

EXAMPLE II

An "E" glass type fiber forming glass batch comprising:

| Component | Percent by Weight |
|---|---|
| Silica | 31.040 |
| Clay | 28.227 |
| Limestone | 21.698 |
| Boric Acid | 3.566 |
| Colemanite | 11.853 |
| Fluorspar | 2.411 |
| Sodium Sulfate | 0.854 |
| Ammonium Sulfate | 0.251 |
| Coal | 0.100 | was combined into pellets. The colemanite used was treated at 1000° F. (537.8° C.) for approximately two hours to remove its chemically bound water prior to its addition to the batch. This composition represented a 30 percent boric acid substitution for colemanite, on a $B_2O_3$ basis. The batch was pelletized and dried in the same manner as in Example I. The resulting pellets were hard and non-dusting and had good mechanical strength.

EXAMPLE III

An "E" glass type fiber forming glass batch comprising:

| Component | Percent by Weight |
| --- | --- |
| Silica | 30.302 |
| Clay | 27.632 |
| Limestone | 24.320 |
| Colemanite | 8.206 |
| Boric Acid | 5.882 |
| Fluorspar | 2.373 |
| Sodium Sulfate | 0.939 |
| Ammonium Sulfate | 0.247 |
| Coal | 0.099 | was combined into pellets. In this example, the colemanite was not pretreated prior to its addition to the batch. This batch represented a 50 percent boric acid substitution for colemanite on a $B_2O_3$ basis. The batch was pelletized and dried as in Example I. The resulting pellets were hard and non-dusting and possessed good mechanical strength.

EXAMPLE IV

An "E" glass type fiber forming glass batch comprising:

| Component | Percent by Weight |
| --- | --- |
| Silica | 30.137 |
| Clay | 27.397 |
| Limestone | 26.174 |
| Colemanite | 4.061 |
| Boric Acid | 8.659 |
| Fluorspar | 2.348 |
| Sodium Sulate | 0.881 |
| Ammonium Sulfate | 0.245 |
| Coal | 0.098 | was combined into pellets. The colemanite was not pretreated prior to its addition to the batch. This batch composition represented a 75 percent substitution of boric acid for the colemanite, on a $B_2O_3$ basis. The batch materials were pelletized and dried as in Example I. The resulting pellets were hard and non-dusting and possessed good mechanical strength.

While the present invention has been described with reference to specific embodiments thereof, it is not intended to be so limited thereby, except as set forth in the accompanying claims.

We claim:

1. A method of preparing a colemanite-containing glass fiber forming glass batch comprising introducing colemanite-containing batch ingredients into a pelletizing zone, agglomerating the ingredients with sufficient water to produce pellets containing about 5 to 20 percent by weight free water, heating the pellets at a temperature not greater than 770° F. (410° C.) and drying the pellets at that temperature for a period of time sufficient to thereby prevent disintegration thereof and form hard, non-dusting pellets.

2. The method of claim 1 wherein up to about 75 percent or more of said colemanite is replaced by boric acid, on a $B_2O_3$ basis.

3. The method of claim 1 wherein said pelletizing zone comprises an inclined rotating disc pelletizer.

4. The method of claim 1 wherein said pellets are produced having nominal diameters of between about 0.375 and 0.625 inch (0.9525 and 1.5875 centimeters).

5. The method of claim 1 wherein the free water is approximately 10 to 13 percent by weight.

6. A method of preparing a colemanite-containing glass fiber forming glass batch comprising treating said colemanite by heating it at a temperature of at least 770° F. (410° C.) for a sufficient period of time to drive off substantially all of the chemically bound water within said colemanite, introducing batch ingredients including said treated colemanite into a pelletizing zone, agglomerating the ingredients with sufficient water to produce pellets containing about 5 to 20 percent by weight free water, heating the pellets at a temperature of at least 220° F. (104.4° C.) and drying the pellets at that temperature for a period of time sufficient to thereby prevent disintegration thereof and form hard, non-dusting pellets.

7. The method of claim 6 wherein said pellets are dried at temperatures of between about 220° F. (104.4° C.) and 1000° F. (537.8° C.).

8. The method of claim 6 wherein the free water is approximately 10 to 13 percent by weight.

* * * * *

Disclaimer 4,074,990.—*Stanley F. Brzozowski,* Coraopolis; *Joseph E. Cooper,* Brackenridge, both of Pa. METHOD OF PREPARING COLEMANITE-CONTAINING GLASS BATCH. Patent dated Feb. 21, 1978. Disclaimer filed June 19, 1986, by the assignee, *PPG Industries, Inc.*

Hereby enters this disclaimer to claims 1, 2, 3, 4 and 5 of said patent.
[*Official Gazette August 26, 1986.*]

// REEXAMINATION CERTIFICATE (111th)

United States Patent [19]

Brzozowski et al.

[11] B1 4,074,990

[45] Certificate Issued Aug. 9, 1983

[54] METHOD OF PREPARING COLEMANITE-CONTAINING GLASS BATCH

[75] Inventors: Stanley F. Brzozowski, Coraopolis; Joseph E. Cooper, Brackenridge, both of Pa.

[73] Assignee: PPG Industries, Inc., Pittsburgh, Pa.

Reexamination Request
No. 90/000,311, Dec. 27, 1982

Reexamination Certificate for:
Patent No.: 4,074,990
Issued: Feb. 21, 1978*
Appl. No.: 739,884
Filed: Nov. 8, 1976

[*] Notice: The portion of the term of this patent subsequent to Feb. 21, 1995, has been disclaimed.

[51] Int. Cl.³ .................. C03C 3/08; C03B 5/16
[52] U.S. Cl. ... 65/27; 65/134; 65/136; 501/29; 501/35
[58] Field of Search ... 65/27, 134, 136.2; 501/29, 501/35

[56] References Cited

U.S. PATENT DOCUMENTS

| | | | |
|---|---|---|---|
| 2,334,961 | 11/1943 | Schoenlaub | 65/134 X |
| 2,366,473 | 1/1945 | Bair | 106/50 X |
| 2,976,162 | 3/1961 | Ekdahl | 65/134 X |
| 3,001,881 | 9/1961 | Slayter | 65/134 X |
| 3,274,006 | 9/1966 | McKinnis | 106/50 |
| 3,287,095 | 11/1966 | Proctor et al. | 65/2 |
| 3,880,639 | 4/1975 | Bodner et al. | 64/134 |
| 3,887,671 | 6/1975 | Metzger | 264/43 |
| 3,914,364 | 10/1975 | Engelleitner et al. | 264/117 |

FOREIGN PATENT DOCUMENTS 2122524  11/1971  Fed. Rep. of Germany.

OTHER PUBLICATIONS

"Boric Oxide-Containing Raw Materials for the Glass Industry" by Ferdinand Sattler (Glastechn. Ber. vol. 49 (1976). No. 2. pp. 37–42).

*Primary Examiner*—R. L. Linsay, Jr.

[57] ABSTRACT

A process is described for preparing colemanite-containing glass batch compositions suitable for the preparation of glass fibers in which the batch, prior to its introduction into the furnace, is pelletized by adding water in sufficient quantities to maintain an adequate balling action and thus provide pellets in a form such that preheating by direct contact with flue gases does not cause deterioration of the pellets.

REEXAMINATION CERTIFICATE ISSUED UNDER 35 U.S.C. 307.

NO AMENDMENTS HAVE BEEN MADE TO THE PATENT.

AS A RESULT OF REEXAMINATION, IT HAS BEEN DETERMINED THAT:

The patentability of claims 1-8 is confirmed.

* * * * *